Patented Nov. 21, 1922.

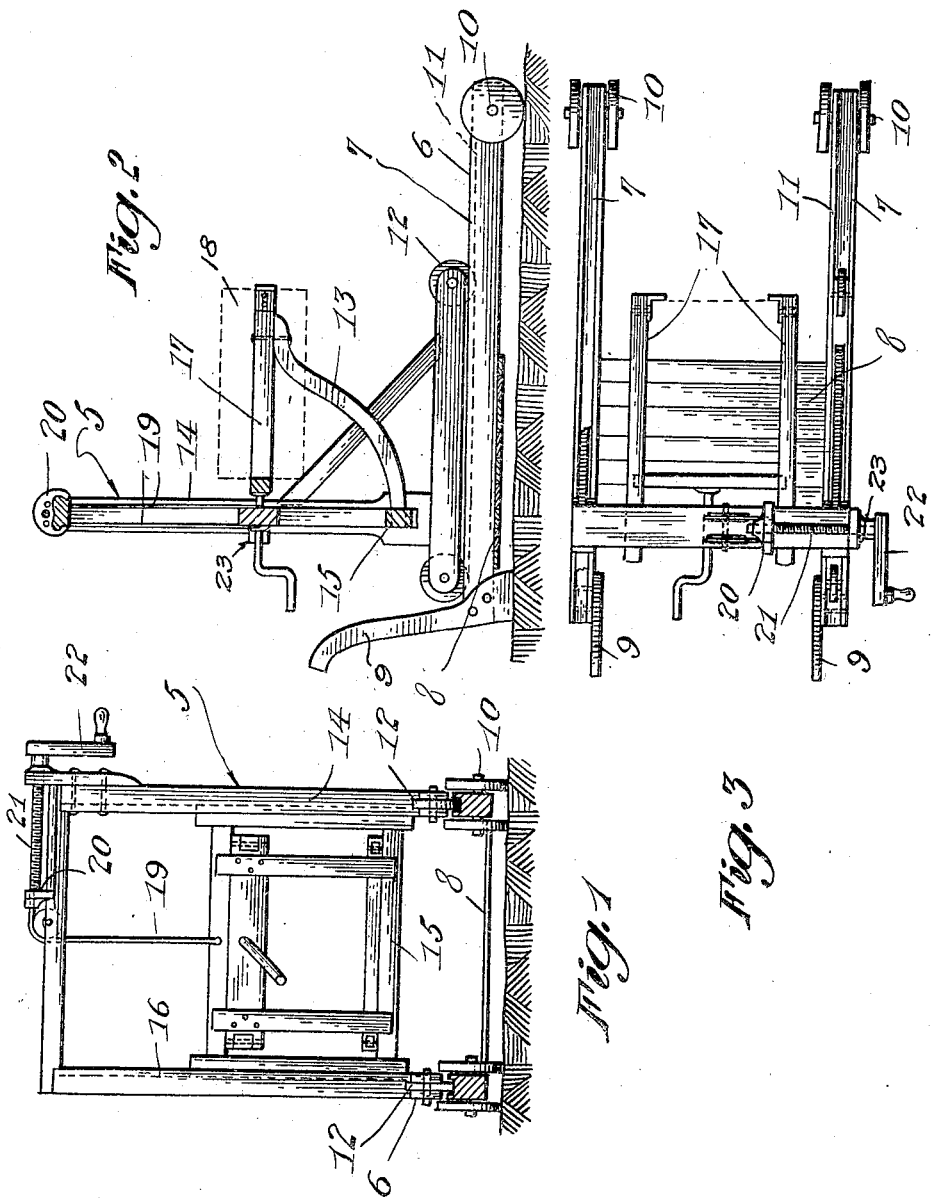

1,436,586

UNITED STATES PATENT OFFICE.

NAPOLÉON GIARD, OF ST. MICHEL DE ROUGEMONT, QUEBEC, CANADA.

APPARATUS FOR RAISING SECTIONS OF HIVES.

Application filed December 16, 1921. Serial No. 523,165.

*To all whom it may concern:*

Be it known that I, NAPOLÉON GIARD, a subject of the King of Great Britain, residing at St. Michel de Rougemont, Province of Quebec, Canada, have invented certain new and useful Improvements in Apparatus for Raising Sections of Hives; and I do hereby declare that the following is a full, clear, and exact description of the invention, such as will enable others skilled in the art to which it appertains to make and use the same.

The present invention relates to new and useful improvements in an apparatus for raising the sections of bee hives for removing other sections from the lower portion of the hives, beneath the one being raised.

The primary object of the invention is the provision of means whereby a certain section of the hive may be gripped and raised, lifting the sections disposed thereabout slightly for permitting the removal of one of the lower sections.

Another object of the invention is the provision of a device of the above specified type which is designed in portable form, comprising a carriage with a supplemental frame movably mounted thereon and having gripping means for engaging the hive sections for raising them as desired.

Still another object of the invention is the provision of a device of the above specified type which will be comparatively simple and inexpensive to manufacture, reliable and efficient in use and readily operated.

With the above and other objects in view, the present invention resides in the novel features of construction, formation, combination and arrangement of parts to be hereinafter more fully described, claimed and illustrated in the accompanying drawing forming a part of the present application, and in which:

Figure 1 is a transverse sectional view of the invention:

Figure 2 is a longitudinal sectional view thereof; and,

Figure 3 is a plan view thereof, with parts broken away.

Referring now to the accompanying drawing by corresponding characters of reference throughout the several views, the numeral 5 designates in general my improved apparatus which consists of a portable base or truck 6 which comprises opposite side members 7 connected at their lower edges by slats 8, provided at their rear ends with handles 9 and at their forward ends with suitable rollers or wheels 10. The upper edges of these members 7 are channeled as at 11 and receive the rollers 12 of a movable frame 13. This frame 13 comprises uprights 14 and a sliding support 15 is mounted in grooves 16 formed therein. This support consists of a pair of forwardly extending brackets 17 designed to grip the sections 18 of a hive, as shown in Figure 2. The member is suspended from cables 19 which are attached to a traveller 20 actuated by a worm 21 through the medium of a crank 22. By the rotation of the crank 22 the brackets 17 will be raised and lowered to the desired position while these said brackets 17 can be moved to and from each other through the crank mechanism 23.

The operation of the device is as follows:

The portable base or truck 6 is grasped by the handles 9 and wheeled to the desired location. The frame 13 is next moved toward the direction of the hive and the brackets 17 spread apart until they pass over the opposite sides of the section desired to be gripped. The crank 23 is then rotated until the brackets 17 firmly clamp themselves upon the section desired, and the crank 22 is then rotated which raises all of the sections together, including the one gripped by the brackets 17 and permits the sections below the brackets 17 to be removed if desired.

An empty section can then be substituted for the one removed and the remaining upper sections can be lowered into position and it will thus be seen that by this apparatus considerable time is saved over removing the sections one by one as it is customary and necessary to do by old and known methods.

From the foregoing description taken in connection with the accompanying drawing, it will be manifest that a means for raising sections of the bee hive for the purpose of removing under sections, is provided which will fulfil all of the necessary requirements of such a device and it should be understood in this connection that various minor changes in the specific details of construction can be resorted to within the scope of the appended claims without departing from the spirit or sacrificing any of the advantages of the invention.

Having thus fully described the inven- tion, what I claim as new and desire to secure by Letters Patent is:

1. The herein described apparatus including a truck, a frame movably mounted upon the truck, brackets supported by the frame, means for spreading and contracting said brackets, and means for raising and lowering the brackets.

2. The herein described apparatus comprising a movable frame, brackets adjustable vertically upon said frame, and means for spreading said brackets and contracting them, as and for the purposes set forth.

3. The herein described apparatus comprising a frame, brackets mounted upon the frame and moving to and from each other, means for raising and lowering the brackets, substantially as and for the purposes set forth.

4. The herein described apparatus comprising a truck, a frame movably mounted thereon, said frame including a pair of side members, a vertically movable member slidable in the slots formed in the side members, means for raising the vertical movable member, means for lowering the same, brackets supported by said member, and means for spreading and contracting the brackets substantially as and for the purposes set forth.

5. The herein described apparatus comprising a truck including channeled side members, a frame having rollers thereon mounted for movement in the channels of the side members, said frame including a pair of vertical members, a support slidable in said vertical members, brackets extending from said support, means for moving the brackets to and from each other and means for raising and lowering the support, for moving the brackets vertically with respect to the truck, substantially as and for the purposes set forth.

In witness whereof I have hereunto set my hand.

NAP. GIARD.